US011410310B2

(12) United States Patent
Hiltl et al.

(10) Patent No.: US 11,410,310 B2
(45) Date of Patent: Aug. 9, 2022

(54) AUTOMATIC IDENTIFICATION OF MEDICALLY RELEVANT VIDEO ELEMENTS

(71) Applicant: KARL STORZ SE & CO. KG, Tuttlingen (DE)

(72) Inventors: Christoph Hiltl, Tuttlingen (DE); Heinz-Werner Stiller, Tuttlingen (DE); Nader Hassanzadeh, Tuttlingen (DE); Mélissa Wiemuth, Tuttlingen (DE); Frank Stock, Tuttlingen (DE); Lars Mündermann, Tuttlingen (DE); Bernd Münzer, Tuttlingen (DE)

(73) Assignee: KARL STORZ SE & Co. KG, Tuttlingen (DE)

( * ) Notice: Subject to any disclaimer, the term of this patent is extended or adjusted under 35 U.S.C. 154(b) by 180 days.

(21) Appl. No.: 16/885,770

(22) Filed: May 28, 2020

(65) Prior Publication Data
US 2020/0294238 A1    Sep. 17, 2020

Related U.S. Application Data

(63) Continuation of application No. 15/809,501, filed on Nov. 10, 2017, now Pat. No. 10,706,544.

(30) Foreign Application Priority Data

Nov. 11, 2016    (DE) .................. 10 2016 121 668.2

(51) Int. Cl.
*G06T 7/00* (2017.01)
*G06T 7/90* (2017.01)
(Continued)

(52) U.S. Cl.
CPC .......... *G06T 7/0016* (2013.01); *G06K 9/6215* (2013.01); *G06T 7/248* (2017.01);
(Continued)

(58) Field of Classification Search
CPC ..... G06K 9/6215; G06T 7/0016; G06T 7/248; G06T 7/74; G06T 7/90;
(Continued)

(56) References Cited

U.S. PATENT DOCUMENTS 6,036,637 A    3/2000 Kudo
6,714,215 B1 *  3/2004 Flora ................. G06F 16/40
                                                    715/838

(Continued)

FOREIGN PATENT DOCUMENTS

WO    WO 2013/114361    8/2013

OTHER PUBLICATIONS

European Search Report for corresponding European Patent Application No. 17201019.1, dated Mar. 15, 2018.
(Continued)

*Primary Examiner* — Katrina R Fujita
(74) *Attorney, Agent, or Firm* — Jason H. Vick; Sheridan Ross, PC (57) ABSTRACT

Apparatus for an automatic identification of medically relevant video elements, the apparatus comprising a data input, configured to receive a data stream of image slices, wherein the data stream of image slices represents a temporal course of a view of image slices defined by a masking strip of video images from a video which has been recorded during a medical surgery on a patient an analysis apparatus configured to analyze the data stream of image slices via an analysis comprising at least one predefined analysis step for the presence of at least one sought-for feature and to output a result of the presence, and a processing device configured to output a start mark which indicates a correspondence between the presence and a position in the data stream of (Continued)

image slices if the result indicates the presence of the sought-for feature. Also, a corresponding method is disclosed.

16 Claims, 7 Drawing Sheets
(1 of 7 Drawing Sheet(s) Filed in Color)

(51) Int. Cl.
  *G06T 7/246*    (2017.01)
  *G06T 7/73*    (2017.01)
  *G06K 9/62*    (2022.01)
  *G06V 10/25*    (2022.01)
  *G06V 10/42*    (2022.01)
  *G06V 10/75*    (2022.01)
  *G06V 20/40*    (2022.01)

(52) U.S. Cl.
  CPC ............ *G06T 7/74* (2017.01); *G06T 7/90* (2017.01); *G06V 10/25* (2022.01); *G06V 10/421* (2022.01); *G06V 10/751* (2022.01); *G06V 20/40* (2022.01); *G06T 2207/10016* (2013.01); *G06T 2207/10024* (2013.01); *G06T 2207/10068* (2013.01); *G06T 2210/41* (2013.01); *G06V 2201/03* (2022.01); *G06V 2201/034* (2022.01)

(58) Field of Classification Search
  CPC . G06T 2207/10016; G06T 2207/10024; G06T 2207/10068; G06T 2210/41; G06V 10/25; G06V 10/421; G06V 10/751; G06V 20/40; G06V 2201/03; G06V 2201/034
  See application file for complete search history.

(56) References Cited

U.S. PATENT DOCUMENTS

| | | | |
|---|---|---|---|
| 7,093,201 B2* | 8/2006 | Duarte | G06F 3/0482 715/810 |
| 9,182,948 B1* | 11/2015 | O'Riordan | G06F 30/30 |
| 9,557,881 B1* | 1/2017 | Jain | G06T 11/206 |
| 2005/0075551 A1 | 4/2005 | Horn et al. | |
| 2007/0268280 A1* | 11/2007 | Fujita | A61B 1/00045 345/204 |
| 2008/0285826 A1 | 11/2008 | Yokoyama | |
| 2009/0003732 A1 | 1/2009 | Oda | |
| 2009/0125840 A1* | 5/2009 | Squilla | G16H 40/20 715/810 |
| 2009/0311655 A1 | 12/2009 | Karkanias et al. | |
| 2010/0045786 A1 | 2/2010 | Kitamura | |
| 2010/0115469 A1 | 5/2010 | Shigemori | |
| 2010/0158330 A1 | 6/2010 | Guissin et al. | |
| 2010/0182412 A1 | 7/2010 | Taniguchi et al. | |
| 2010/0208047 A1 | 8/2010 | Kitamura | |
| 2011/0196201 A1 | 8/2011 | Sato et al. | |
| 2013/0051680 A1 | 2/2013 | Kono et al. | |
| 2013/0286038 A1* | 10/2013 | Kamath | G06T 7/0012 345/592 |
| 2014/0109002 A1* | 4/2014 | Kimball | G06F 3/04842 715/830 |
| 2015/0016700 A1 | 1/2015 | Drozdal et al. | |
| 2015/0116361 A1* | 4/2015 | Braun | G06T 7/0012 345/634 |
| 2015/0138329 A1 | 5/2015 | Braun et al. | |
| 2015/0187063 A1 | 7/2015 | Takahashi | |
| 2015/0313445 A1 | 11/2015 | Davidson et al. | |
| 2015/0332196 A1* | 11/2015 | Stiller | G16H 70/20 705/2 |
| 2016/0055886 A1* | 2/2016 | Saur | G11B 27/28 386/241 |
| 2016/0125644 A1 | 5/2016 | James et al. | |
| 2016/0239967 A1 | 8/2016 | Chou et al. | |
| 2016/0247276 A1 | 8/2016 | Chou et al. | |
| 2016/0259888 A1* | 9/2016 | Liu | G16H 30/40 |
| 2016/0296181 A1* | 10/2016 | Abkai | G06T 7/0012 |
| 2018/0137622 A1 | 5/2018 | Hiltl et al. | |
| 2018/0322949 A1 | 11/2018 | Mohr et al. | |

OTHER PUBLICATIONS

Office Action for U.S. Appl. No. 15/809,501, dated May 14, 2019.
Office Action for U.S. Appl. No. 15/809,501, dated Oct. 22, 2019.
Office Action for U.S. Appl. No. 15/809,501, dated Feb. 28, 2020.

\* cited by examiner

AUTOMATIC IDENTIFICATION OF MEDICALLY RELEVANT VIDEO ELEMENTS

CROSS REFERENCE TO RELATED APPLICATIONS

This application is a continuation of U.S. application Ser. No. 15/809,501, filed Nov. 10, 2017, now U.S. Pat. No. 10,706,544, which claims priority from German patent application DE 10 2016 121 668.2, filed on Nov. 11, 2016. The entire contents of these priority applications are incorporated herein by reference.

BACKGROUND OF THE INVENTION

The disclosure relates to an apparatus and a method for an automatic identification of medically relevant video elements.

In a medical environment, especially during surgery, very large amounts of video data may be produced, which may be used, for example, for purposes of documentation, quality assurance, learning or scientific considerations.

Today there exist cameras that can produce images at a high resolution, for example a resolution of 1920×1080 pixels or 3840×2160 pixels. Further, today exist highly advanced possibilities for storing large amounts of data.

The continuously increasing amount of stored videos leads to a very reliable documentation of all processes, but it becomes more and more difficult for humans to review the stored videos with regard to relevant video elements. Even if videos are played at an increased speed, many hours may still be needed to identify relevant video elements.

It is therefore an object to disclose an apparatus for an automatic identification of medically relevant video elements in a video.

SUMMARY OF THE INVENTION

According to one aspect there is provided an apparatus for an automatic identification of medically relevant video elements, the apparatus comprising:
- a data input, configured to receive a data stream of image slices, wherein the data stream of image slices represents a temporal course of a view of image slices defined by a masking strip of video images from a video which has been recorded during a medical surgery on a patient,
- an analysis apparatus configured to analyze the data stream of image slices via an analysis comprising at least one predefined analysis step for the presence of at least one sought-for feature and to output a result of the presence, and
- a processing device configured to output a start mark which indicates a correspondence between the presence and a position in the data stream of image slices if the result indicates the presence of the sought-for feature.

In order to find a solution that addresses the object, the inventors have realized that when using powerful image analysis techniques, e.g. searching for areas of substantially identical color or for certain shapes, good results for the automatic identification of medically relevant video elements may be obtained.

However, at the same time, the inventors have realized that the present methods of image analysis require a great amount of computations, so that in view of the large amounts of video data significant requirements regarding the required computing power must be fulfilled. Further, the inventors have realized that an analysis of a video must be planned for in advance and cannot be done on-the-fly.

According to one aspect of the disclosure, the automatic analysis is done in an image slice or in a data stream of image slices which is obtained from a video image or a data stream of video images (video). The inventors have realized that the identification of medical relevant video elements, especially in a video which has been recorded during an endoscopic operation by a camera received in the body of the patient, can also be performed based on a very small excerpt from the picture.

The disclosure uses terms as video image, masking strip and image slice. A video image is to be understood in particular as an image from a video which is produced by a video camera. The video camera may be an endoscopic video camera. The video camera may preferably produce at least 15 images per second, more preferably at least 30 images per second and in particular at least 60 images per second. The resolution of the video camera is preferably at least 1920×1080 pixels and in particular at least 3640×2160 pixels. The resolution of the video image corresponds to the resolution of the video camera for some exemplary embodiments. In other exemplary embodiments the resolution of the video image is different than the resolution of the video camera, in particular it may be smaller.

The masking strip defines an excerpt from the video image at a location where a good automatic identification of medically relevant video elements may be expected. Such masking strip or multiple masking strips can be determined by consideration or by experiment, in particular by applying an analysis on already existing video imagery. Preferably the masking strip has an at least substantially rectangular or straight-line shape.

The pixels of the video image that are covered by the masking strip are used for the image slice. For some exemplary embodiments the pixels of the video image which are only partially covered by the masking strip are used for the image slice, whereas this is not the case for other exemplary embodiments. For some exemplary embodiments the covering is not checked based on single pixels, but based on blocks of pixels. The blocks of pixels may in particular have a size that is chosen from the group consisting of 2×2 pixels, 4×4 pixels, 8×8 pixels and 16×16 pixels. For some exemplary embodiments a minimum percentage of coverage or overlap is provided so that a pixel or a block of pixels is used in the image slice. For some exemplary embodiments the pixel blocks are disjunct, i.e. they do not overlap.

For some exemplary embodiments the masking strip comprises one or more of the following features:
- A width position of the middle of a masking strip is spaced apart in a width direction from the image center by not more than 30%, preferably not more than 15%, more preferably not more than 5% and in particular not more than 2%.
- A height position of the middle of a masking strip is spaced apart in a width direction from the image center by not more than 30%, preferably not more than 15%, more preferably not more than 5% and in particular not more than 2%.
- A strip height of the masking strip has at least 25%, preferably at least 40%, more preferably at least 65% and in particular at least 75% of the height of the video images.
- A strip height of the masking strip has not more than 99%, preferably not more than 95%, more preferably not more than 90% and in particular not more than 80% of the height of the video images.

A strip width of the masking strip has not more than 16 pixels, preferably not more than 8 pixels, preferably not more than 4 pixels and in particular not more than 2 pixels.

A strip angle of the masking strip which is formed between a direction of the strip height of the masking strip and an edge of the video images is not more than 30°, preferably not more than 15°, more preferably not more than 5° and in particular not more than 1°.

A strip angle of the masking strip which is formed between a direction of the strip height of the masking strip and an edge of the video images corresponds to an angle of arctan(1/n) with n≥1. Such angle is especially useful when working with pixel blocks.

The masking strip is chosen depending on the type of surgery and/or the present phase of the surgery.

For some embodiments the image slice is produced by placing the masking strip onto the video image in its original resolution. For other exemplary embodiments the masking strip is placed on a reduced or compressed version of the video image. For some exemplary embodiments the size of the image slice is changed after the masking, in particular it is reduced.

Since the analysis apparatus now has to analyze only an image slice or a plurality of image slices or the data stream of image slices, the automatic identification of the medically relevant video elements can be performed quicker, in particular it can be performed on-the-fly.

The relevant video elements are especially relevant video images (points of interest, POI) or relevant video segments (segments of interest, SOI).

If the analysis apparatus has identified the presence of a sought-for feature, it outputs a corresponding result. The processing device then outputs a start mark which indicates a correspondence between the presence of the sought-for feature and a position in the data stream of image slices which corresponds to an image slice. Since each image slice was generated from a corresponding video image, the position in the video may be determined based on the start mark. The processing device thus outputs information which is indicative of an image in the video that was identified as a medically relevant video element.

If a relevant video image was searched for, such relevant video image is obtained using said start mark. If a relevant video segment was searched for, the beginning of such relevant video segment is obtained using said start mark.

Based on the start mark the video may be positioned at the desired position either automatically or by the user. The medically relevant video element may then be viewed immediately.

According to an exemplary embodiment, the processing device is further configured to output an end mark which indicates a correspondence between a missing presence of the sought-for feature and a position in the data stream of image slices, if the result indicates the missing presence of the sought-for feature after a start mark has been output.

This allows to determine a relevant video segment for such exemplary embodiment, if the presence of a sought-for feature was determined, it is now monitored at which time the sought-for feature is no longer present. If the feature, after it was present before, is now missing, this location is indicated by the end mark. Thus, the segment between the start mark and the end mark indicates a segment during which the sought-for feature was present. The segment may then be played from the start mark and may be stopped at the end mark either automatically or by the user.

For some exemplary embodiments the image slice has a width of 1 pixel when it is transferred into the data stream of image slices.

According to a refinement, the analysis determines a color saturation in at least one image slice from the data stream of image slices and indicates the presence of the sought-for feature if the color saturation falls below a threshold of the color saturation, wherein the sought-for feature is a smoke emission.

During endoscopic surgery electrical instruments are used for cauterizing or cutting of body tissues by thermal methods. This leads to smoke emission which shows in the video as a reduced saturation of the pixel values. In the image slice areas where a smoke emission occurs may be identified based on the reduced color saturation. If it is determined that the color saturation falls below a threshold in the image slice, this allows a corresponding conclusion that a smoke emissions is present in the corresponding video image. In an exemplary embodiment the average of color saturation of all pixels of the image slice is determined. For other exemplary embodiments either the maximum value of the color saturation of all pixels in the image slice or the minimal value of the color saturation of all pixels in the image slice is determined. The resulting values are then compared to the threshold value.

In a further refinement the analysis determines a color saturation in at least two image slices from the data stream of image slices and indicates the presence of the sought-for feature if the color saturation becomes smaller over time, wherein the sought-for feature is a smoke emission.

This refinement allows for an advanced detection of smoke emission. Since the color saturation of different organs in the human body may be different when viewed, the refinement is directed at a change of the color saturation. If a reduction of the color saturation over time is determined, a conclusion is made that a smoke emission is present. For some exemplary embodiments minimum values for the reduction are defined which, if exceeded, indicate a smoke emission. A notable loss in color saturation indicates the beginning of a potential scene with smoke emission. An increase of the saturation values may indicate the end of a scene with smoke emission, so that an end of a smoke emission can be identified in a corresponding manner.

In some exemplary embodiments the color saturation is determined as an average color saturation taken over at least two image slices, preferably at least three image slices, more preferably at least five image slices and in particular at least ten or at least thirty image slices, wherein the image slices are in particular image slices found in sequence in the data stream of image slices. For some exemplary embodiments a window is moved over the image slices and an average saturation value is calculated for all the image slices the window covers. It is noted that the average analysis for at least two images slices, in particular applying a window, may also be used for other types of analyses in this disclosure.

In a refinement the analysis performs a transformation of color information in at least one image slice from the data stream of image slices into the L*a*b* color space and indicates whether color values of pixels in the at least one image slice exceed a threshold in an a-channel of the L*a*b* color space, wherein the sought-for feature is the presence of a metallic instrument.

By transforming the color space into the L*a*b* color space instrument pixels, i.e., such pixels that image a part of a medical instrument, can be distinguished from non-instrument pixels. To do so, a threshold in the a-channel of the L*a*b* color space is monitored. This allows to identify, based on an image slice, a relevant video image or a relevant video segment where a medical instrument may be seen in the video. For exemplary embodiments the threshold of the a-value is chosen as approximately 135 when considering a total range of values of 0-255. The a-value indicates the opponent color value on the red-green axis. For some exemplary embodiments, the threshold value is calculated by calculating the histogram for the opponent color value. This may be supplemented by an analysis for extreme values. Also, the threshold may be determined by experiments.

In a further refinement the analysis determines in at least two image slices, where the color values of the pixels exceed the threshold in the a-channel, the respective position of the pixels and calculates from a comparison of the positions of the pixels a movement of the pixels, wherein the sought-for feature is a movement of the metallic instrument.

By analyzing the positions of the pixels which exceed the threshold value in the a-channel, additional information regarding the movement of the instruments is obtained. If the image slice is obtained via a vertical masking strip, information is obtained regarding a vertical movement of at least one instrument. The determined movement provides information regarding if, how much or in which direction an instrument is moved. This allows to identify not only the use of an instrument but also certain types of surgery. If only a small movement is determined, in other words the movement pattern is rather still, this may mean that a hold function is applied to the instrument. For some preferred embodiments tensor histograms which describe the orientation of the pixels per unit of time can be used to differentiate between different movements or movement patterns.

In a further refinement the analysis determines a hue in at least one image slice from the data stream of image slices and indicates whether the hue exceeds a threshold of a red component, wherein the sought-for feature is a recording within a body of the patient.

This refinement preferably uses the hue-channel of the HSV-histogram. The hue-value of the pixel corresponds to the angle of the hue on a chromatic circle, wherein 0° represents red, 120° represents green and 240° represents blue. Within the body of a patient the hue-value lies in the vicinity of red, including ocher, pink and light pink, thus especially close to 0° or 360° which corresponds to the color red and its shades. If the value of the hue-channel of an image slice lies within a range which is at a distance of the range from 120° to 240°, preferably less than 120° or greater than 240°, more preferably less than 90° or greater than 270° and in particular less than 60° or greater than 300°, this indicates that the camera is inside the patient.

In a further refinement the analysis determines a luminance in at least one image slice from the data stream of image slices and indicates whether the luminance exceeds a threshold, wherein the sought-for feature is a recording outside of a housing.

This refinement allows to determine whether the recording took place outside of a housing, for example outside of a storage unit or a heating. This is based on the considering that the image of the camera is very dark, especially black, if the camera is within a housing. Then, the image slice is very dark, so that the luminance of the image slice is small. On the other hand, if the luminance exceeds a threshold, it may be concluded that the recording took place outside of a housing.

In a further refinement the analysis determines a hue in at least one image slice from the data stream of image slices and indicates whether the hue exceeds a threshold of a red component, wherein the sought-for feature is a bleeding.

The hue is analyzed on the one hand regarding the hue-value and also regarding a saturation value and/or a brightness value. The required values can be determined by experiment. For preferred embodiments it is checked whether the hue-value lies between 330° and 5°, preferably between 335° and 360° and in particular between 340° and 355°. Further, it is checked, whether the saturation value and/or the brightness value is at at least 50%, preferably at least 60%, more preferably at least 70% and in particular at least 80%. The specific values may be determined by the skilled person via experiments. The analysis may also be performed in other color spaces as long as the color of blood is distinguishable e.g. from body tissue.

In a further refinement the analysis determines a color saturation of the color red in at least two image slices from the data stream of image slices and indicates the presence of the sought-for feature if there is an increase of the color saturation over time, wherein the sought-for feature is a bleeding.

This refinement allows for an enhanced detection of a bleeding. Since the color saturation of red may be different when viewing different organs within the human body, this refinement makes use of a change in the color saturation of the color red. If an increase of the color saturation over time is determined, the presence of a bleeding is concluded. Preferably, minimum values for the increase are determined which, when exceeded, indicate a bleeding. A notable increase in the color saturation indicates the beginning of a potential scene involving a bleeding. A decrease of the saturation values can mark the end of a scene involving a bleeding, so that in a corresponding manner the ending of a bleeding can be identified.

In a further refinement the analysis calculates by comparing the positions of corresponding pixels in at least two image slices from the data stream of image slices a movement of pixels, wherein the sought-for feature is a movement of the recording device that recorded the video.

This analysis allows to check if and/or how stable the video camera was maintained. In particular, a tensor histogram of the pixels may be used. When the recording device moves, a plurality of the pixels will move in a substantially uniform direction, so that a movement of the recording device can be distinguished from a movement of objects within the video image. By applying an analysis of extreme values over the temporal course of the tensor histogram, it may be become possible to evaluate the stability of the camera or a steadiness of the scenes.

In a further refinement the analysis evaluates at least one image slice from the data stream of image slices regarding a degree of sharpness and indicates whether the degree of sharpness falls below a threshold, wherein the sought-for feature is a blurring.

Blurred areas within the video are indicated by hardly visible edges, especially when analyzing at least two adjacent image slices. Such blurred scenes may be detected using known methods, in particular the method applying a difference of Gaussians. In particular, as has been explained above, a window may be moved over the image slices to measure these differences in order to identify blurred video regions. This is based on the consideration that within such window which comprises a plurality of image slices, the number of edges is notably more reduced in a sharp image than in a blurred image. As an alternative or in addition, the number and/or the distinctness of the edges may be considered.

In a further refinement upon presence of the metallic instrument and the blurring the sought-for feature is that the recording device which recorded the video is located in a tubular instrument.

This refinement may allow, for example, to determine whether the video camera was located in a trocar during the recording.

In a further refinement the analysis generates a target image slice from a target image using the masking strip and compares at least one image slice from the data stream of image slices with the target image slice, wherein the sought-for feature is a match or a high similarity between the target image slice and the at least one image slice.

This may allow to quickly and effectively identify the desired target image in a data stream of video images. Since only the generated target image slice is compared to the image slices from the data stream of image slices, the check regarding a correspondence or a significant similarity can be performed quickly.

In a further refinement the apparatus further comprises a generation device for image slices configured to receive the video, to mask the video images except for the masking strip and to output resulting image slices as the data stream of image slices, in particular to the data input.

This refinement allows for a full processing starting from the video which was recorded during a surgery via an endoscopic camera.

In a further refinement the generation device for image slices is configured to compress the video images before masking and/or to compress the resulting image slices, in particular using a discrete cosine transformation This refinement allows for an effective processing. In an exemplary embodiment the size of the video image and/or of the resulting image slice is reduced. An embodiment using a discrete cosine transformation is based on the consideration that some image information is more important or more dominant than other image information. From the result of the cosine transformation not all coefficients are used, but only the first coefficients, meaning the most important coefficients. For some exemplary embodiments only the first major coefficient is used which indicates the main color information of one or more pixels. This allows to significantly reduce the amount of data and thus increases the speed of processing.

In a further refinement the compression is applied to blocks of pixels of the video image, wherein the blocks, in particular, have a size of 8×8 pixels.

This refinement may be beneficial since known image formats like JPG or MPEG are also based on blocks of 8×8 pixels. In particular in connection with the discrete cosine transformation a simple possibility to compare the image data of an image slice and of a desired target image may be obtained. Comparing a desired target image to a video stream to be searched may be particularly easy if the same coding is used, so that the coded data may be compared directly with one another and do not have to be each decoded.

According to a further refinement the generation device for image slices is configured to generate a first data stream of image slices using a first masking strip and to generate a second data stream of image slices using a second masking strip, wherein the first masking strip and the second masking strip differ at least regarding one characteristic chosen from the group comprising a width position, a height position, a strip height, a strip width and a strip angle.

This refinement may allow for a reliable identification of medically relevant video elements even if potentially more than one location in the video images could contain relevant information. Then, masking strips are used at two or more locations of the video image in order to generate respective data streams of image slices. If a sought-for feature is found in one of the data streams of image slices it is assumed that a medically relevant video element is present. As an alternative, two masking strips or two data streams of image slices can be used for an increased reliability. In particular it can be defined that a medically relevant video element is only indicated, if one or more sought-for features are present in both data streams of image slices.

According to a further aspect there is disclosed a method for an automatic identification of medically relevant video elements, the method comprising the steps of:

receiving, via a data input, a data stream of image slices, wherein the data stream of image slices represents a temporal course of a view of image slices defined by a masking strip of video images from a video which has been recorded during a medical surgery on a patient, analyzing, via an analysis comprising at least one predefined analysis step, the data stream of image slices for the presence of a sought-for feature, outputting a result of the presence, and outputting a start mark which indicates a correspondence between the presence and a position in the data stream of image slices, if the result indicates the presence of the sought-for feature.

It is noted that the apparatus for an automatic identification of medically relevant video elements can also be used for an automatic identification of medically irrelevant video elements. This may be done by looking for a corresponding opposite feature. For example, a medically relevant video element may be identified by finding a sufficient sharpness, so that the medically irrelevant video element may be identified by determining that there is no sufficient sharpness, i.e. a blurring. Or, as a further example, a medically relevant video element may be identified, if the luminance exceeds a threshold. In contrast, a medically irrelevant video element may be identified by falling below or not exceeding a certain threshold.

It is noted that the previously described features and the features described in the following may not only be applied in the given combination, but may also be applied in other combinations or even in isolation without leaving the scope and spirit of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the disclosure are shown in the figures and are explained in the following description. The figures show.

DESCRIPTION OF PREFERRED EMBODIMENTS

Figure 1:
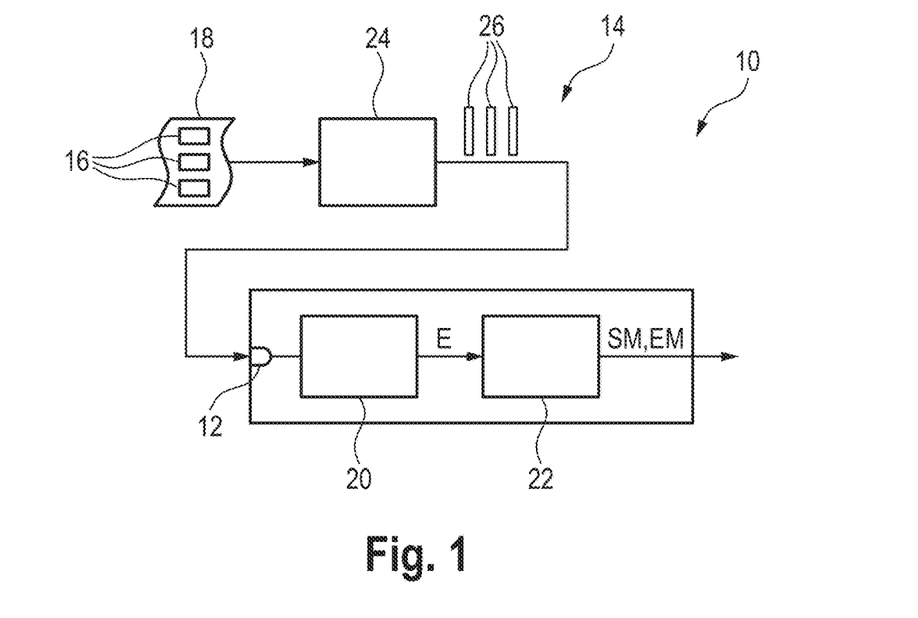
FIG. 1 shows an embodiment of an apparatus for an automatic identification of medically relevant video elements.

FIG. 1 shows an embodiment of an apparatus 10 for an automatic identification of medically relevant video elements. The apparatus 10 comprises a data input 12 which is configured to receive a data stream 14 of image slices, wherein the data stream 14 of image slices represents a temporal course of a view of image slices defined by a masking strip 30 (see FIG. 2) of video images 16 from a video 18 which has been recorded during a medical surgery on a patient.

An analysis apparatus 20 is configured to analyze the data stream 14 of image slices via an analysis comprising at least one predefined analysis step for the presence of at least one sought-for feature and to output a result E of the presence.

The apparatus 10 further comprises a processing device 22 which is configured to output a start mark SM which indicates a correspondence between the presence and a position in the data stream 14 of image slices if the result E indicates the presence of the sought-for feature. In this embodiment the processing device 22 is further configured to output an end mark EM which indicates a correspondence between a missing presence of the sought-for feature and a position in the data stream 14 of image slices, if the result E indicates the missing presence of the sought-for feature after a start mark SM has been output.

The apparatus 10 further comprises a generation device 24 for image slices which is configured to receive the video 18, mask the video images 16 except for the masking strip and to output resulting image slices 26 as the data stream 14 of image slices, in particular to the data output 12.

Figure 2:
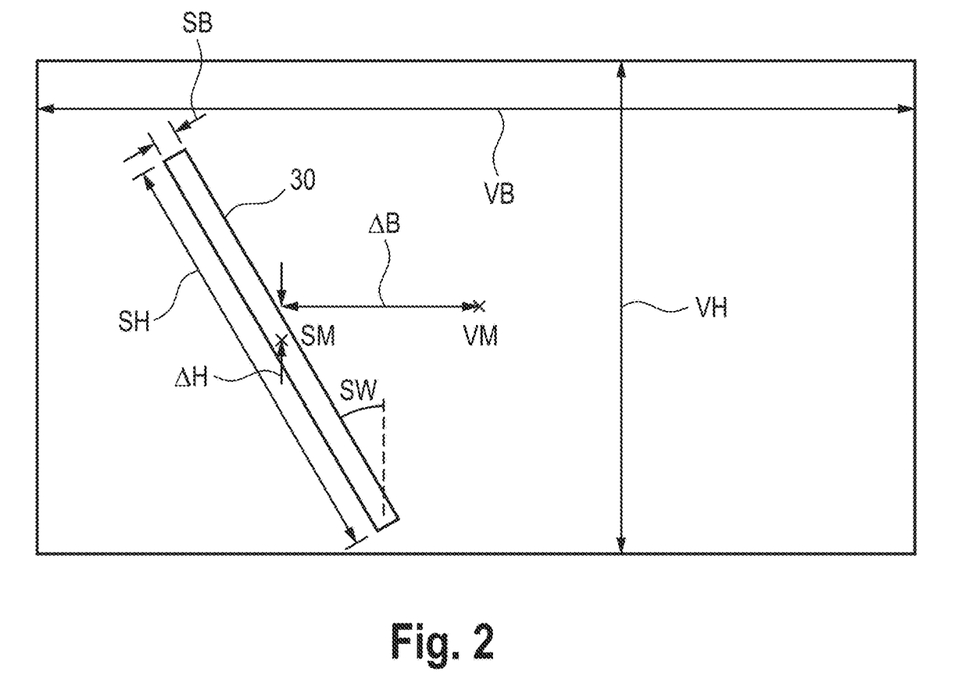
FIG. 2 shows an embodiment of a masking strip.

FIG. 2 shows an embodiment of a masking strip.

In addition, FIG. 2 shows a possible way to describe the characteristic features of the masking strip 30. VH describes the height of a video image 16, VB describes the width direction of the video image 16 and VM describes the center point of the video image 16. SH describes the height of the masking strip 30, SB describes a width of the masking strip 30 and SM describes a center point of the masking strip 30. A distance between the center point VM of the video and the center point SM of the masking strip 30 has a value of AB along the width direction of the video image 16 and a value of ΔH along the height direction of the video image 16. Here, a strip angle SW of the masking strip 30 is measured relative to the height direction of the video image.

Figure 3:
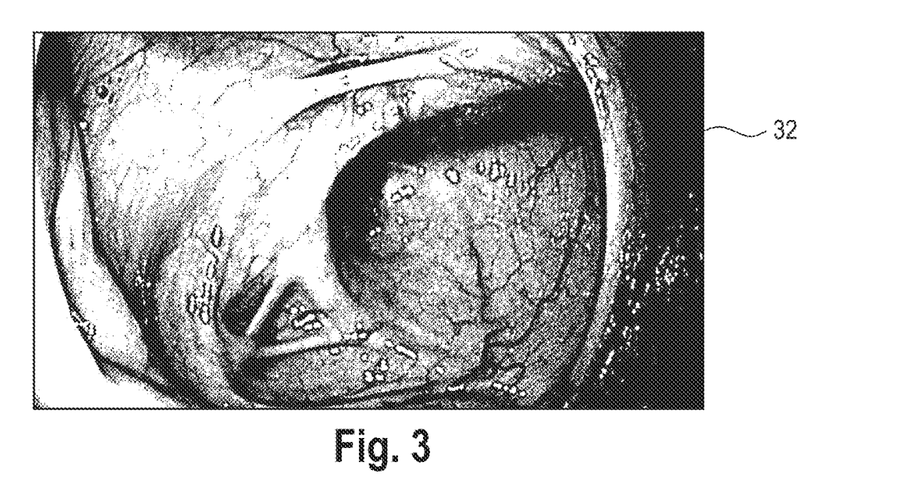
FIG. 3 shows an example of an endoscopic video image.

FIG. 3 shows an exemplary endoscopic video image.

Figure 4:
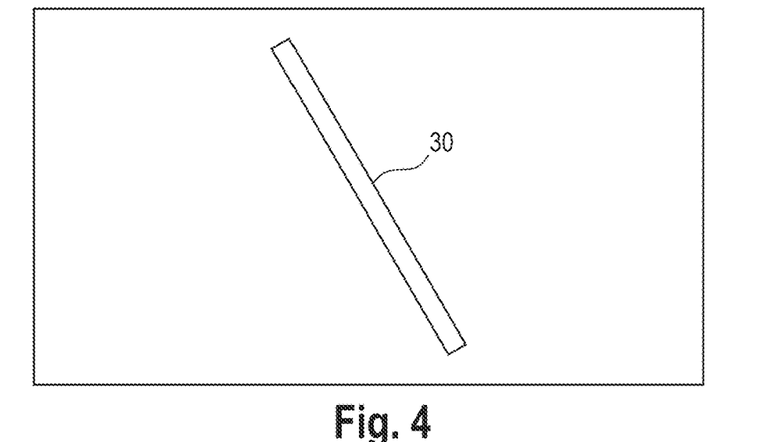
FIG. 4 shows a further embodiment of a masking strip.

FIG. 4 shows a further embodiment of a masking strip.

Figure 5:
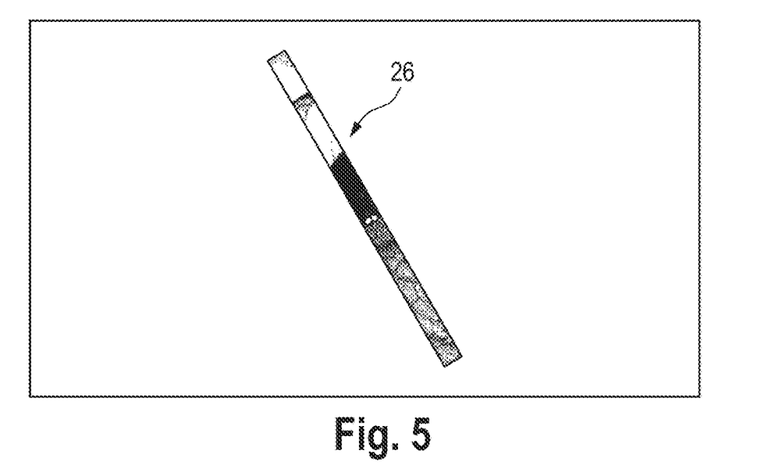
FIG. 5 shows an embodiment of an image slice that results from the application of the masking strip.

FIG. 5 shows an embodiment of an image slice which results from the application of a masking strip. Before the image slice 26 is transferred into the data stream 14 of image slices, the image slice 26 is preferably rotated into an upright orientation so that the image slices 26 in the data stream 14 of image slices are adjacent to each other along their long side.

Figure 6:
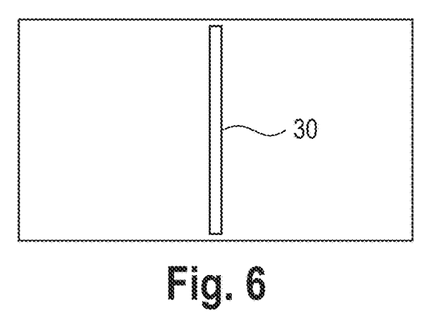
FIGS. 6 to 13 show further embodiments of one or more masking strips.

FIG. 6 shows an embodiment of a masking strip 30 which is arranged vertically and in the middle.

Figure 7:
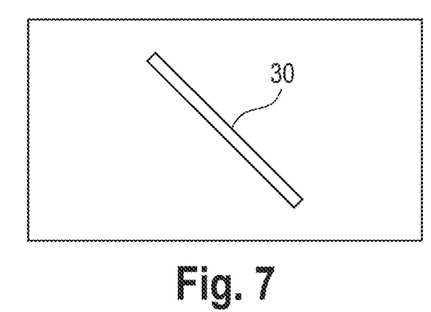

FIG. 7 shows an embodiment of a masking strip which is arranged in the middle and at an angle of 45°.

Figure 8:
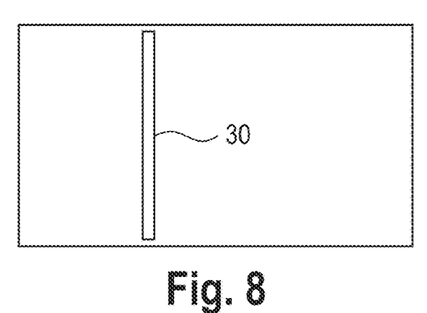

FIG. 8 shows an embodiment of a masking strip which is at approximately 33% of the width VB of the video image and is vertically arranged.

Figure 9:
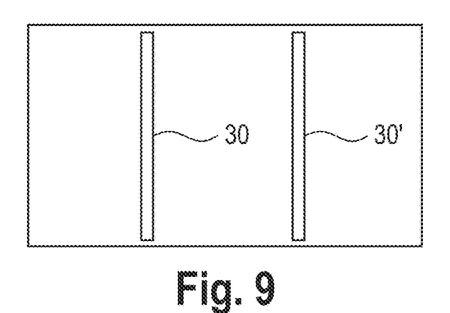

FIG. 9 shows an embodiment having a first masking strip 30 and a second masking strip 30' which are vertically oriented. The first masking strip 30 is at approximately 33% of the image width and the second masking strip 30' is at approximately 67% of the image width.

Figure 10:
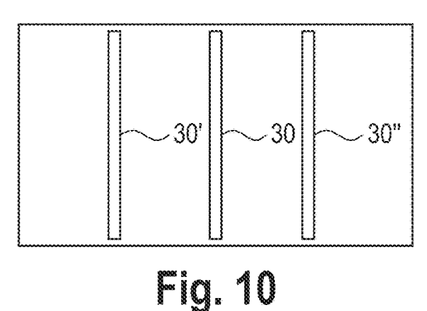

FIG. 10 shows an embodiment of a first masking strip 30, a second masking strip 30' and a third masking strip 30" which are vertically oriented. The first masking strip 30 is arranged at approximately 50% of the image width, the second masking strip 30' is arranged at approximately 25% of the image width, and the third masking strip 30" is arranged at approximately 75% of the image width.

Figure 11:
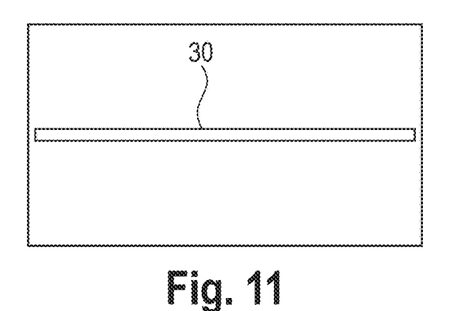

FIG. 11 shows an embodiment of a masking strip 30 which is arranged at approximately 50% of the height VH of the video image and is horizontally oriented.

Figure 12:
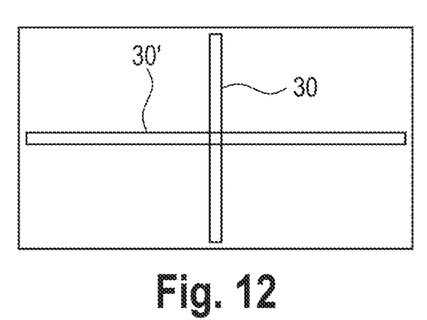

FIG. 12 shows a combination of the masking strips according to FIG. 6 and FIG. 11.

Figure 13:
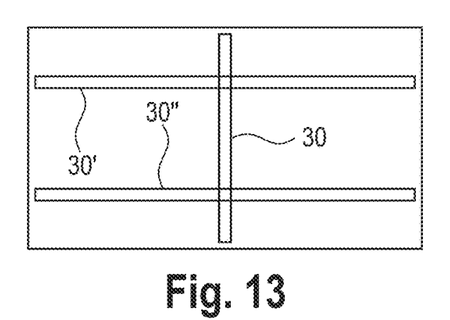

FIG. 13 shows an embodiment having a vertical first masking strip 30, a horizontal second masking strip 30' and a horizontal third masking strip 30". The first masking strip 30 is arranged at approximately 50% of the image width, the second masking strip 30' is arranged at approximately 33% of the image height, and the third masking strip 30" is arranged at approximately 67% of the image height.

Figure 14:
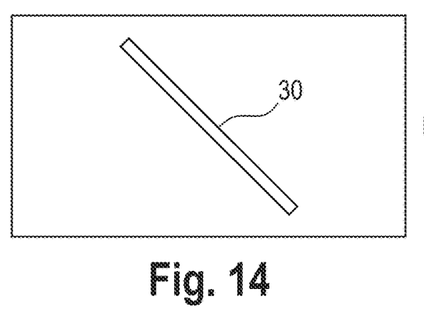
FIGS. 14 to 21 show embodiments for the use of pixel blocks.
Figure 15:
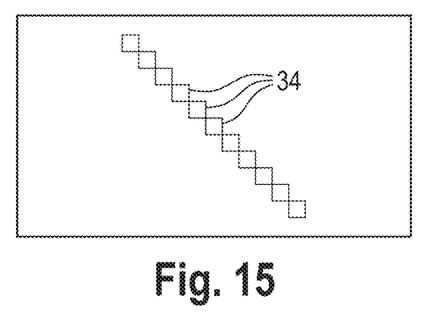

FIG. 14 shows a masking strip 30 which is arranged in the middle at an angle of approximately 45°. FIG. 15 shows symbolically how the masking strip 30 may be represented by pixel blocks 34, wherein the pixel blocks 34 may in particular have a size of 8×8 pixels.

Figure 16:
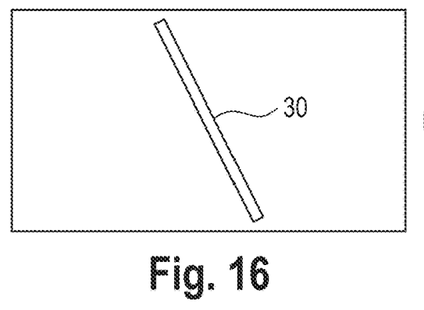
Figure 17:
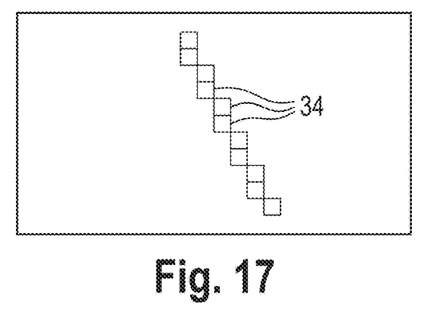

FIG. 16 shows a masking strip 30 which is arranged in the middle and at an angle of approximately 26°. FIG. 17 shows symbolically how the image strip 30 may be represented by pixel blocks 34, wherein the pixel blocks 34 may in particular have a size of 8×8 pixel.

Figure 18:
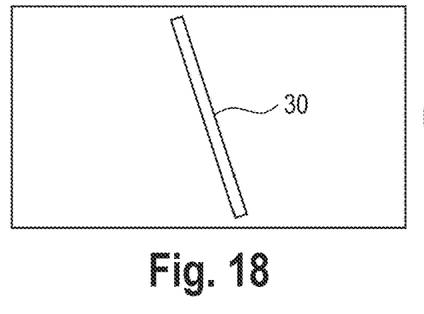
Figure 19:
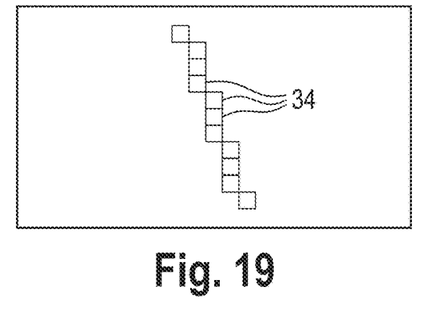

FIG. 18 shows a masking strip 30 which is arranged in the middle and at an angle of approximately 18°. FIG. 19 shows symbolically how the image strip 30 may be represented by pixel blocks 34, wherein the pixel blocks 34 may in particular have a size of 8×8 pixel.

Figure 20:
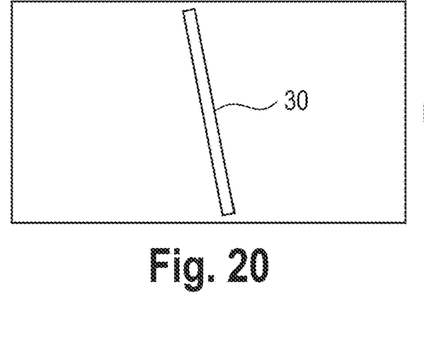
Figure 21:
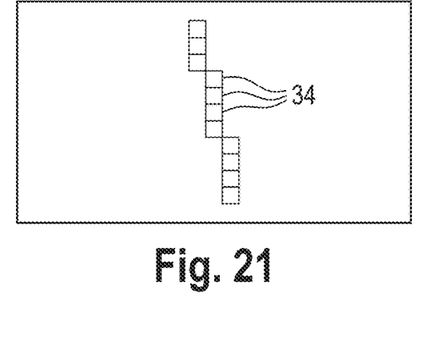

FIG. 20 shows a masking strip 30 which is arranged in the middle and at an angle of approximately 11°. FIG. 21 shows symbolically how the image strip 30 may be represented by pixel blocks 34, wherein the pixel blocks 34 may in particular have a size of 8×8 pixel.

Figure 22:
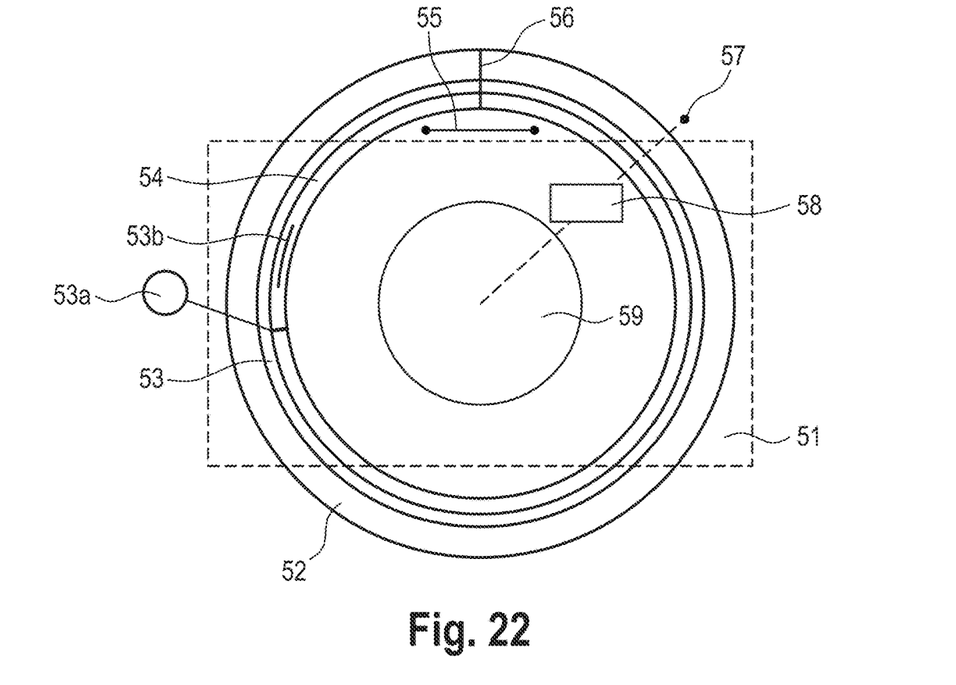
FIG. 22 shows a first embodiment of a schematic representation when using image slices.

FIG. 22 shows a first embodiment of a schematic representation when using image slices. There are shown: a video area 51, a circular representation 52 of all image slices 26, especially in the shape of a videogram, a circular representation 53 of the phases of the surgery, an indicator 53a of relevant video images comprising a thumbnail preview, an indicator 53b of relevant video segments, a circular indicator 54 for the indication of a quality of the video content, an indicator 55 indicating a time and zoom factor, an indicator indicating the point in time of the image shown in the video area 51 within the data stream 14 of image slices or within the video 18, a multi-function pointer 57 comprising a thumbnail preview, a previous window 58 and a control area 59.

The video is shown at 51. As a result of a post-processing of the video data and a compressed visualization of the video 18, a data stream 14 of image slices is shown at 52. Phases of the surgery which may have been marked by the user are shown at 53.

Medically relevant video elements are indicated at 53a and 53b. An evaluation is shown at 54, wherein according to an exemplary embodiment the following colors are used: green as an indication of a good quality of the images, orange as an indication for a bad quality (e.g. blurred, too dark, shaky), blue as an indication of a recording outside the body of a patient, dark blue as an indication of a recording using fluorescence, and black as an indication that no evaluation was performed. Time-related information, especially the length of the video or a zoom factor, is shown at 55. The present point in time of playing the video is shown at 56.

Using the multi-functional pointer 57 it is possible to jump to a certain point in time. The preview window 58 shows the corresponding frame from the respective position within the video. In addition to the automatic identification of medically relevant video elements, further relevant video elements as well as text messages, speech recordings and drawings can be manually added using a context menu of the multi-functional pointer 57. The context menu may comprise specific functions like "delete POI", "delete SOI", "modify start mark of POI", "modify start mark/end mark of SOI", "add description" and "export to playlist". Exporting to playlist means that manually marked segments or automatically determined segments may be concatenated and then exported. Such exported data represents only a part of the total data that is available. Upon request, only this data is shown in the circular representation.

To control the video, functions like "start", "stop", "pause", "fast advance", "fast rewind", "jump to next POI", "jump to previous POI" may be provided at 59 when a control element, in particular a mouse pointer, enters this area. The speed of the fast advance or fast rewind may be configured.

When the video 18 is played, it is shown at 51, and the representations 52, 53, 54 as well as the indicators 53a, 53b rotate counter-clockwise at a speed which corresponds to the "zoomed" length of the video 18. The present point in time is shown at the 12 o'clock position at 56. For other exemplary embodiments, the representations 52, 53, 54 and indicators 53a, 53b may be static while 56 rotates in a clockwise direction.

At a control element, in particular the wheel of a mouse, the zoom factor may be changed at 55. if the mouse wheel is moved forward, the zoom factor is increased and only the corresponding part of the video is shown at 51. The representation of the data at 52, 53, 54, 53a and 53b is adjusted correspondingly along with the speed of the circular representations. If the mouse wheel is rotated backwards, the zoom factor is reduced and said adjustments are performed correspondingly.

Figure 23:
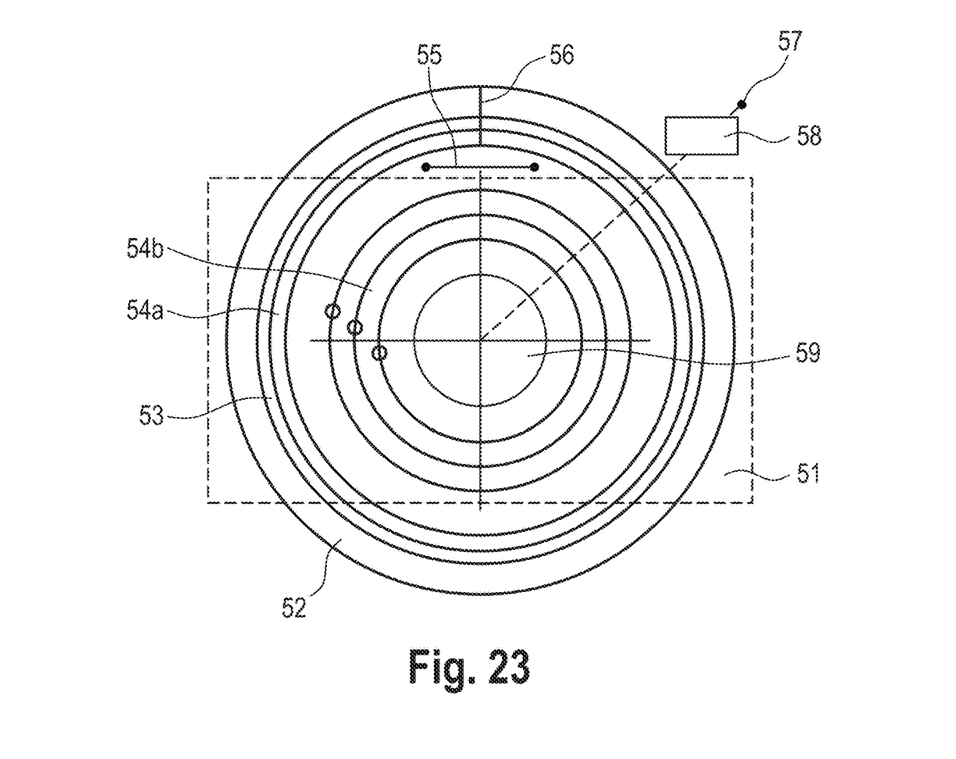
FIG. 23 shows a second embodiment of a schematic representation when using image slices.

FIG. 23 shows a second embodiment of a schematic representation when using image slices. There are shown: a video area 51, a circular representation 52 of all image slices 26, in particular as a videogram, as circular representation 53 of the phases of the surgery, a circular indicator 54a of relevant video images and relevant video segments, configurable circular indicators 54b of relevant video images and relevant video segments which may be provided from other medical data sources (for example medical devices, navigational systems, process management systems, anesthesia systems, imaging radiology systems), an indicator 55 indicating a time and zoom factor, an indicator 56 indicating a point in time of the image shown in the video area 51 within the data stream 14 of image slices or within the video 18, a multi-function pointer 57 comprising a thumbnail preview, a previous window 58 and a control area 59.

Regarding the functionality the explanations made in the context of FIG. 22 apply correspondingly. Said colors are represented in the black- and white representation by corresponding hachures.

Figure 24A:
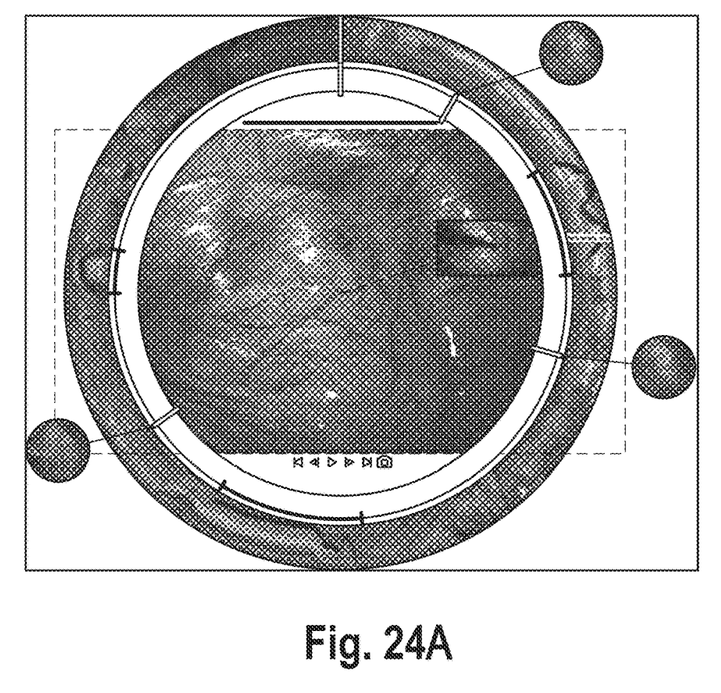
FIGS. 24A-B show a first embodiment of a specific graphical representation when using image slices.
Figure 24B:
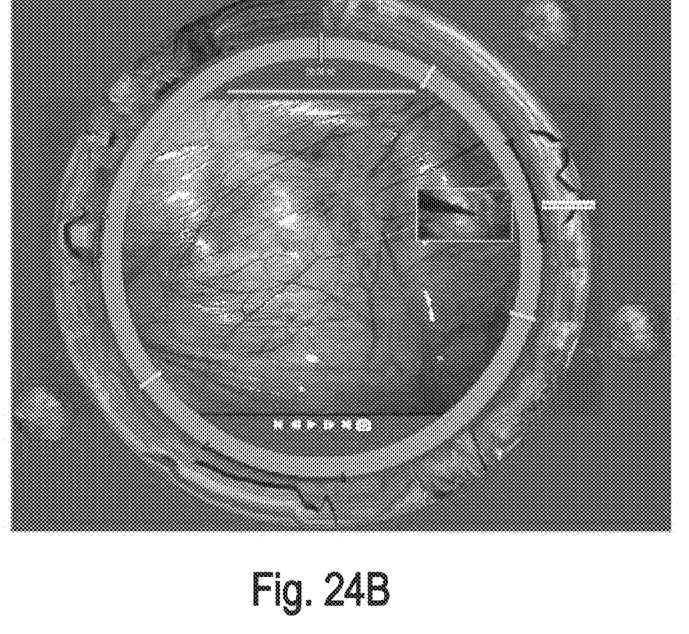

FIG. 24 shows a first embodiment of a specific graphical representation when using image slices.

Figure 25A:
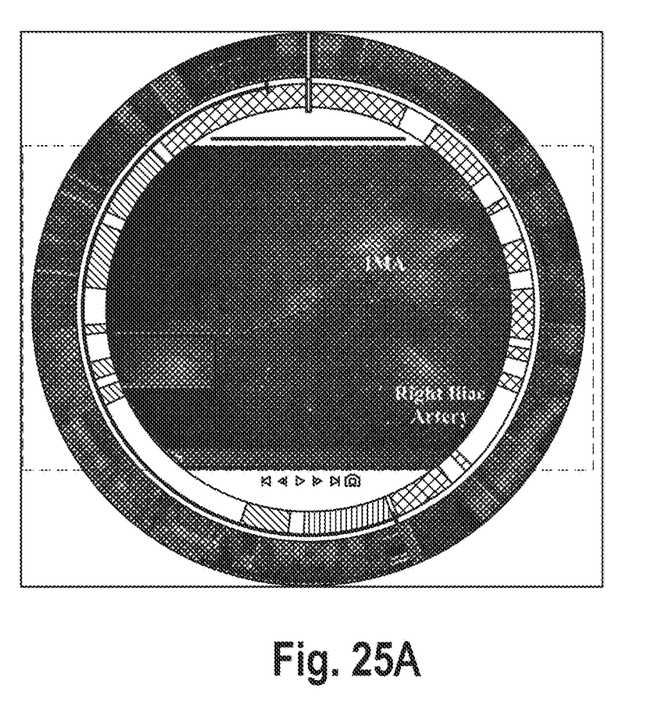
FIGS. 25A-B show a second embodiment of a specific graphical representation when using image slices.
Figure 25B:
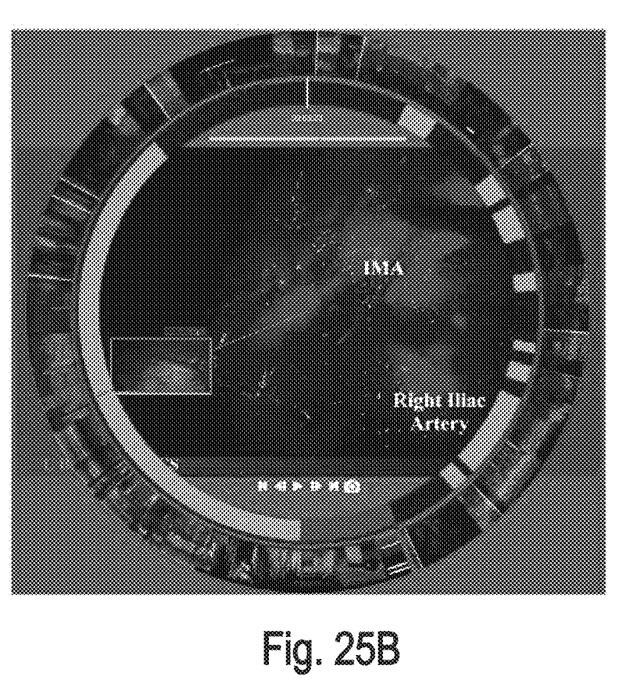

FIG. 25 shows a second embodiment of a specific graphical representation when using image slices.

What is claimed is:

1. An apparatus configured to display a medical video, from a surgical procedure on a patient, and medical video elements, the apparatus comprising:
   a video area configured to display the medical video elements generated by a generation device, wherein the medical video elements include:
      a plurality of image slices obtained from a plurality of frames of the medical video,
      an indicator corresponding to one or more phases of the surgical procedure on the patient, and
      a start mark which indicates a presence of a sought-for feature in one or more of the plurality of image slices, wherein:
   the apparatus utilizes a plurality of colors to display an indication of a quality of the plurality of imagine slices, wherein a first color represents a poor quality of the plurality of image slices, a second color represents video recording outside a patient's body and a third color represents fluorescence recording.

2. The apparatus of claim 1, further comprising a thumbnail preview.

3. The apparatus of claim 1, further comprising an indication of a time and a zoom factor.

4. The apparatus of claim 1, further comprising an indication of a time within a video stream.

5. The apparatus of claim 1, further comprising an identification of medically relevant video elements.

6. The apparatus of claim 1, wherein green represents a good quality of the plurality of image slices.

7. The apparatus of claim 1, wherein the plurality of image slices from the surgical procedure on the patient are shown in a circular configuration.

8. The apparatus of claim 1, wherein during playback of the medical video the plurality of image slices is shifted such that an image slice of the plurality of image slices corresponding to a currently displayed frame of the plurality of frames is displayed at a fixed location.

9. The apparatus of claim 1, where the apparatus is configured to concatenate and export segments of the medical video that have been one of manually marked and/or automatically determined based on the presence of the sought-for feature.

10. An apparatus configured to display a medical video, from a surgical procedure on a patient, and medical video elements, the apparatus comprising:
    a video area configured to display the medical video elements generated by a generation device, wherein the medical video elements include:
       a plurality of image slices obtained from a plurality of frames of the medical video,
       an indicator corresponding to one or more phases of the surgical procedure on the patient, and
       a start mark which indicates a presence of a sought-for feature in one or more of the plurality of image slices; and an indicator of a quality of the plurality of image slices, wherein the plurality of image slices is arranged in an elongated first shape, wherein the indicator has a second shape corresponding to the first shape, and wherein the first shape is spaced apart from the second shape, wherein the first and second shapes are one or more of circular and concentric.

11. The apparatus of claim 10, wherein the indicator comprises a plurality of segments of at least two different colors.

12. An apparatus configured to display a medical video, from a surgical procedure on a patient, and medical video elements, the apparatus comprising:
a video area configured to display the medical video elements generated by a generation device, wherein the medical video elements include:
a plurality of image slices obtained from a plurality of frames of the medical video,
an indicator corresponding to one or more phases of the surgical procedure on the patient, and
a start mark which indicates a presence of a sought-for feature in one or more of the plurality of images slices,
the apparatus further comprising a pointer on a first side of the plurality of slices and a preview window on a second side of the plurality of slices opposite the first side, wherein the pointer and the preview window are connected by a line and the preview window shows a frame of the plurality of frames corresponding to one of the plurality of slices that is crossed by the line.

13. The apparatus of claim 12, wherein a position of the pointer can be set independently of a present point in time of a playback of the medical video.

14. The apparatus of claim 12, wherein the pointer comprises a context menu allowing to add at least one of text messages, speech recordings and drawings.

15. The apparatus of claim 12, wherein the plurality of image slices is arranged as a circle, wherein the line extends to a center of the circle.

16. An apparatus configured to display a medical video, from a surgical procedure on a patient, and medical video elements, the apparatus comprising:
a video area configured to display the medical video elements generated by a generation device, wherein the medical video elements include:
a plurality of image slices obtained from a plurality of frames of the medical video,
an indicator corresponding to one or more phases of the surgical procedure on the patient, and
a start mark which indicates a presence of a sought-for feature in one or more of the plurality of image slices,
the apparatus further comprising a pointer on a first side of the plurality of slices and a preview window on the first side of the plurality of slices, wherein the pointer and the preview window are connected by a line that extends beyond the plurality of slices to a second side of the plurality of slices opposite the first side, and the preview window shows a frame of the plurality of frames corresponding to one of the plurality of slices that is crossed by the line.

* * * * *